United States Patent [19]

Staiger et al.

[11] Patent Number: 5,304,621

[45] Date of Patent: Apr. 19, 1994

[54] ORGANO(POLY)SILOXANES CONTAINING TERMINAL SILOXANE UNITS HAVING ORGANYLOXY AND HYDROGEN GROUPS

[75] Inventors: Gerhard Staiger, Altoetting; Rudolf Braun, Kastl; Johann Mueller; Michael Stepp, both of Burghausen; Werner Brennenstuhl, Burgkirchen; Petra Absmaier, Emmerting, all of Fed. Rep. of Germany

[73] Assignee: Wacker-Chemie GmbH, Munich, Fed. Rep. of Germany

[21] Appl. No.: 938,212

[22] PCT Filed: Apr. 25, 1991

[86] PCT No.: PCT/EP91/00795
§ 371 Date: Dec. 7, 1992
§ 102(e) Date: Dec. 7, 1992

[87] PCT Pub. No.: WO91/16371
PCT Pub. Date: Oct. 31, 1991

[30] Foreign Application Priority Data

Apr. 26, 1990 [DE] Fed. Rep. of Germany ....... 4013281
Aug. 9, 1990 [DE] Fed. Rep. of Germany ....... 4025281
Sep. 17, 1990 [DE] Fed. Rep. of Germany ....... 4029481

[51] Int. Cl.$^5$ .............................................. C08G 77/06
[52] U.S. Cl. ........................................ 528/12; 528/14; 528/15; 528/18; 528/19; 528/17; 528/21; 528/31
[58] Field of Search ................ 528/31, 12, 14, 21, 528/18, 19, 17, 15; 556/451, 479, 487

[56] References Cited

U.S. PATENT DOCUMENTS

| | | |
|---|---|---|
| 2,811,506 | 10/1957 | Constan ................................ 528/31 |
| 2,823,218 | 11/1958 | Speier et al. . |
| 2,970,150 | 1/1961 | Bailey . |
| 3,159,601 | 1/1964 | Ashby . |
| 3,159,602 | 1/1964 | Hamilton et al. . |
| 3,338,868 | 8/1967 | Goosens . |
| 3,814,730 | 6/1974 | Karstedt et al. . |
| 3,996,195 | 12/1976 | Sato et al. . |
| 4,177,341 | 4/1979 | Kreis et al. . |
| 4,276,252 | 6/1981 | Kreis et al. . |
| 4,329,273 | 5/1982 | Hardman et al. . |
| 4,434,283 | 2/1984 | Sattlegger et al. . |
| 4,489,191 | 12/1984 | Chung . |
| 4,737,562 | 4/1988 | Chaudhury et al. . |
| 4,755,578 | 7/1988 | Lucas . |
| 4,900,362 | 2/1990 | Fujiki et al. . |
| 5,128,494 | 7/1992 | Blum ....................................... 528/31 |

FOREIGN PATENT DOCUMENTS

| | | |
|---|---|---|
| 538964 | 6/1955 | Belgium . |
| 0022976 | 1/1981 | European Pat. Off. . |
| 0203753 | 12/1986 | European Pat. Off. . |
| 0241759 | 10/1987 | European Pat. Off. . |
| 1081663 | 5/1960 | Fed. Rep. of Germany . |
| 3801389 | 7/1989 | Fed. Rep. of Germany . |
| 3906514 | 6/1990 | Fed. Rep. of Germany . |
| 79-76529 | 6/1979 | Japan . |
| 79-76530 | 6/1979 | Japan . |

OTHER PUBLICATIONS

W. Noll "Chemistry and Technology of Silicones" (1968) Chp. 8.1.2.3.
W. Noll, Chemistry and Technology of Silicones, Academic Press, Orlando, 1968, p. 191 ff.
M. Wick, G. Kreis, F. H. Kreuzer "Silicones", Ullmann's Encyclopedia of Industrial Chemistry, Verlag Chemie, Weinhaim, 4th Edition, 1982, vol. 21, p. 511 ff.
Chemical Abstracts, vol. 84, No. 6, Sep. 2, 1976, p. 63, abstract No. 32341n, (Columbus, Ohio, U.S.); and SU-A-487 916 (D. Y. Zhinkin et al.) Oct. 15, 1975.
Patent Abstracts of Japan, vol. 4, No. 69 (C-11) (551), May 22, 1980, and JP-A-55 036 0268 (Shinetsu Kagaku Kogyo K.K.), Mar. 13, 1980.
M. Wick, G. Kreis, F. H. Kreuzer (Silicones), Ullmann's Encyclopedia of Industrial Chemistry, VErlag Chemie, Weinheim, 4th Edition, 1982, vol. 21, p. 485 ff.

*Primary Examiner*—Melvyn I. Marquis
*Attorney, Agent, or Firm*—Martin Connaughton

[57] ABSTRACT

Organo(poly)siloxanes with siloxane units at the end of the chain having organyloxy and hydrogen groups are disclosed as well as a process for producing the same by reacting α,w-dihydroxyorgan(poly)siloxanes with silanes having a group that can be easily separated and their use in organo(poly)siloxane mixtures that can be stored in the absence of water but which can be cross-linked into elastomers at ambient temperature in the presence of water. Also, a process is disclosed for producing organopolysiloxane elastomers by cross-linking cross-linkable mixtures by addition of Si-linked hydrogen to SiC-linked residues with aliphatic carbon-carbon multiple linkage.

15 Claims, No Drawings

ORGANO(POLY)SILOXANES CONTAINING TERMINAL SILOXANE UNITS HAVING ORGANYLOXY AND HYDROGEN GROUPS

The invention relates to organo(poly)siloxanes containing terminal siloxane units having organyloxy and hydrogen groups, to processes for their preparation and their use in organo(poly)siloxane compositions which are stable on storage in the absence of water but can be crosslinked in the presence of water at as low as room temperature with the elimination of alcohols to give elastomers, and to processes for the preparation of organo(poly)siloxane elastomers by crosslinking of compositions which are crosslinkable by adduct formation of Si-bound hydrogen with SiC-bound radicals having an aliphatic carbon-carbon multiple bond.

U.S. Pat. No. 4,755,578 (G. M. Lucas, General Electric Company; issued on Jul. 5, 1988) describes compositions containing diorganopolysiloxanes which contain terminal siloxane units having organyloxy groups, which compositions are stable on storage in the absence of water and can be crosslinked in the presence of moisture with the elimination of alcohol to give elastomers. These compositions contain a metal catalyst, in particular tin compounds, for accelerating the crosslinking rate, which, however, substantially impairs the storage stability of these compositions.

German Offenlegungsschrift 3,801,389 (Wacker-Chemie GmbH; issued on Jul. 27, 1989) and the corresponding U.S. application Ser. No. 29 3909 (filed on Jan. 6, 1989) describe organopolysiloxane compositions which are crosslinkable with the elimination of alcohols to give elastomers, which compositions are stabilised by means of salts from main and sub group II containing branched carboxylic acids. However, compositions of this type in general have a very low crosslinking rate, which makes it necessary to add metal compounds, such as, for example, tin compounds, as condensation catalyst for acceleration. However, this frequently impairs the storage stability, so that compositions of this type no longer cure or only cure at a very slow rate after an extended period of storage.

A large number of processes for the preparation of organopolysiloxane elastomers by crosslinking of compositions which are crosslinkable by adduct formation of Si-bound hydrogen with SiC-bound radicals having an aliphatic carbon-carbon multiple bond, in which the addition reaction is in general carried out in the presence of a catalyst, are known. However, the elastomer-forming compositions have in most cases very poor adhesion on a number of substrates, as a result of which many attempts have already been made to improve adhesion. To this end, the corresponding substrates were, for example, provided with a primer before applying these elastomer-forming compositions. However, such a procedure is not very desirable, since it involves additional process steps, such as application and drying. Another possibility is to incorporate substances having an adhesive action in the elastomer-forming compositions of this type before their application on the particular substrate or to modify the polymers contained in the elastomer-forming compositions with organic functions in a suitable manner. In this context, reference may be made, for example, to U.S. Pat. No. 4,737,562 (Dow Corning Corp.; issued on Apr. 12, 1988), U.S. Pat. No. 4,329,273 (General Electric Company; issued on May 11, 1982) and U.S. Pat. No. 3,996,195 (Shinetsu Chemical Company; issued on Dec. 7, 1976). In most cases, these substances having adhesive action or the adhesion-improving organic function cause substantial inhibition of the crosslinking catalyst, which in general is a metal from sub group VIII and compounds thereof, so that it is necessary to employ high temperatures for rapid vulcanisation and rapid development of the adhesive action.

The invention relates to organo(poly)siloxanes containing terminal siloxane units having organyloxy and hydrogen groups.

The organo(poly)siloxanes according to the invention containing terminal siloxane units having organyloxy and hydrogen groups are preferably those of the formula

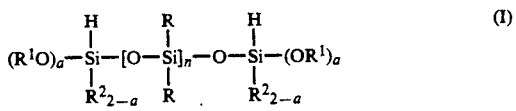

in which

R, $R^1$ and $R^2$, independently of one another, can each be identical or different and denote a monovalent, substituted or unsubstituted hydrocarbon radical, preferably a monovalent, substituted or unsubstituted hydrocarbon radical having 1 to 13 carbon atoms, n is an integer of at least 2, preferably between 10 and 2500, particularly preferably between 10 and 1000, in particular between 20 and 500, and a is 1 or 2, preferably 2.

Although not shown by formula (I), up to 10 mol per cent of the diorganosiloxane units can be replaced by other siloxane units, such as, for example $RSiO_{3/2}$ and/or $SiO_{4/2}$ units, in which R has the meaning given above. Furthermore, the organo(poly)siloxanes according to formula (I) —although also not shown in formula (I)—can contain, as a result of the preparation, up to 20 mol per cent of other function groups, such as, for example, hydroxyl groups. Furthermore, the organo(poly)siloxanes according to the invention, although not shown in formula (I), can also contain, as a result of the preparation,

groups or $R^1O—SiR_2^2$ groups to a small extent, in which $R^1$ and $R^2$ have the meaning given above.

Examples of hydrocarbon radicals having 1 to 13 carbon atoms are alkyl radicals, such as methyl, ethyl, n-propyl, iso-propyl, n-butyl, iso-butyl, tert.-butyl, n-pentyl, iso-pentyl, neo-pentyl, tert.-pentyl, hexyl radicals, such as the n-hexyl, heptyl radicals, such as n-heptyl, octyl radicals, such as n-octyl, iso-octyl and 2,2,4-trimethylpentyl, nonyl radicals, such as n-nonyl, decyl radicals, such as n-decyl, dodecyl radicals, such as n-dodecyl; alkenyl radicals, such as vinyl and allyl; cycloalkyl radicals, such as cyclopentyl, cyclohexyl, cycloheptyl and methylcyclohexyl radicals; aryl radicals, such as phenyl and naphthyl; alkaryl radicals, such as o-, m- or p-tolyl radicals, xylyl radicals and ethylphenyl radicals; aralkyl radicals, such as benzyl, alpha- and β-phenylethyl.

Examples of substituted hydrocarbon radicals are alkoxyalkyl radicals, such as methoxyethyl, halogenoalkyl radicals, such as trifluoropropyl, and acyloxyalkyl radicals, such as acetoxyethyl.

The radical R is particularly preferably an alkyl group, which can be unsubstituted or substituted by alkyl groups, in particular a methyl group.

The radical $R^1$ is particularly preferably an alkyl group, in particular an ethyl group.

The radical $R^2$ is particularly preferably an alkyl group, which can be unsubstituted or substituted by alkyl groups, in particular a methyl group.

Examples of organo(poly)siloxanes according to the invention containing terminal siloxane units having organyloxy and hydrogen groups are
α,ω-bis(hydrogendimethoxysiloxy)dimethyl(poly)siloxanes,
α,ω-bis(hydrogendiethoxysiloxy)dimethyl(poly)siloxanes,
α,ω-bis(hydrogenmethoxymethylsioloxy)dimethyl(poly)siloxanes,
α,ω-bis(hydrogenethoxymethylsiloxy)dimethyl(poly)siloxanes and
α,ω-bis(hydrogendiethoxysiloxy)dimethyl/methylvinylco(poly)siloxanes.

The organo(poly)siloxanes of the formula (I) according to the invention have a viscosity of preferably 2 to $10^7$ mPa·s at 23° C.

The organo(poly)siloxanes according to the invention containing terminal siloxane units having organyloxy and hydrogen groups are preferably prepared by reacting α,ω-dihydroxyorgano(poly)siloxanes of the formula

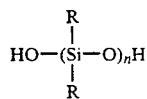

(II)

with silanes of the formula

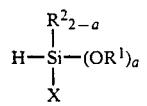

(III)

in which
R, $R^1$, $R^2$, a and n have one of the abovementioned meanings and X is an easily detachable, such as, for example,

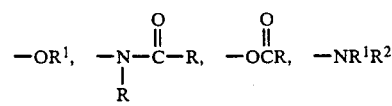

and a chlorine atom, in particular $-OR^1$, in which R, $R^1$ and $R^2$ have one of the abovementioned meanings.

Although not shown by formula (II), up to 10 mol per cent of the diorganosiloxane units can be replaced by other siloxane units, such as, for example, $RSiO_{3/2}$ and/or $SiO_{4/2}$ units, in which R has the abovementioned meaning.

Examples of α,ω-dihydroxyorgano(poly)siloxanes of the formula (II) used in the process according to the invention are α,ω-dihydroxydimethyl(poly)siloxanes and α,ω-dihydroxydimethyl/methylvinylco(poly)siloxanes.

The α,ω-dihydroxyorgano(poly)siloxanes used in the process according to the invention preferably have a viscosity of 2 to $10^7$ mPa·s, particularly preferably 10 to $10^6$ s mPa·s, at 23° C.

The α,ω-dihydroxyorgano(poly)siloxane of the formula (II) used in the process according to the invention can be of a single type or a mixture comprising at least two different types of such α,ω-dihydroxyorgano(poly)siloxanes.

The α,ω-dihydroxyorgano(poly)siloxanes used in the process according to the invention are commercial products or can be prepared by processes known to those skilled in the art.

Examples of silanes of the formula (III) used in the process according to the invention are triethoxysilane, trimethoxysilane, methyldiethoxysilane, methyldimethoxysilane and vinyldimethoxysilane.

In the process according to the invention, the silane of the formula (III) is preferably used in amounts of 1 to 10 mol, particularly preferably in amounts of 2 to 5 mol, in each case relative to 1 mol of α,ω-dihydroxyorgano(poly)siloxane of the formula (II).

The silane of the formula (III) used in the process according to the invention can be of a single type or a mixture comprising at least two different types of such silanes.

The silanes of the formula (III) used in the process according to the invention are commercial products or can be prepared by processes known to those skilled in the art. See, for example, M. Wick, G. Kreis, F.-H. Kreuzer, "Silicone" (Silicones), in "Ullmann's Encyklopädie der technischen Chemie" (Ullmann's Encylopaedia of Industrial Chemistry), Verlag Chemie, Weinheim, 4th Edition, 1982, Vol. 21, page 485 ff.

The reaction according to the invention of the α,ω-dihydroxyorgano(poly)siloxane according to the formula (II) with the silane of the formula (III) is preferably carried out in the presence of a catalyst.

Examples of catalysts used in the process according to the invention are acids, such as, for example, hexanoic acid, 2-ethylhexanoic acid, lauric acid and malonic acid, bases, such as, for example, quinoline, and compounds having enolisable groups, such as, for example, coumaranone, dihydrocoumarin, phenols, such as, for example, 2,6-di-tert.-butyl-4-methylphenol, 1,3-dicarbonyl compounds, such as, for example, pentanedione and benzylacetone, carboxylic esters, such as, for example, propyl acetate, allyl acetoacetate, and carboxylic salts, such as, for example, calcium octoate.

The catalyst preferably used in the process according to the invention comprises $C_2$-$C_{16}$-carboxylic acids and $C_2$-$C_{16}$-dicarboxylic acids, hexanoic acid, 2-ethylhexanoic acid and lauric acid being particularly preferred.

In the process according to the invention, the catalyst is preferably used in amounts of 0 to 2 per cent by weight, particularly preferably 0 to 1 per cent by weight, in each case relative to the total weight of the α,ω-dihydroxyorgano(poly)siloxane used.

The process according to the invention is preferably carried out at a pressure of 900 to 1100 hPa and a temperature of 23° to 220° C., particularly preferably 100° to 180° C., although it can also be carried out at higher or lower pressures.

The advantage of the process according to the invention is that the organo(poly)siloxanes according to the invention containing terminal siloxane units having organyloxy and hydrogen groups can be prepared in a simple manner, substantially selectively, with short reaction times and high yields.

The organo(poly)siloxanes prepared according to the invention and containing terminal siloxane units having organyloxy and hydrogen groups can be used for all purposes, for which organo(poly)siloxanes containing organyloxy groups or hydrogen groups have also previously been used, such as, for example, for producing coatings, as adhesion promoters, in filled compositions and in sealing compounds.

The advantage of the organo(poly)siloxanes according to the invention containing terminal siloxane units having organyloxy and hydrogen groups is that they can be crosslinked in a simple manner and in a surprisingly short period of time in the presence of moisture.

This crosslinking is advantageously carried out in tee presence of a condensation catalyst, such as, for example, an (organo)metal compound, carboxylic acids and amines, even mild condensation catalysts, such as carboxylic acids and amines, being sufficient and preferred.

Examples of condensation catalysts are carboxylic acids, such as hexanoic acid, 2-ethylhexanoic acid, lauric acid and malonic acid, amines, such as tributylamine, dimethylbenzylamine and triethanolamine, and salts of carboxylic acids, alcoholates and halides of the metals Pb, Zn, Zr, Ti, Sb, Fe, Cd, Sn, Ba, Ca and Mn, carboxylic acids being particularly preferably used.

To crosslink the organo(poly)siloxane according to the invention containing terminal siloxane units having organyloxy and hydrogen groups, the condensation catalyst is preferably used in amounts of 0 to 5% by weight, relative to the total weight of the organopolysiloxane according to the invention. This crosslinking is preferably carried out at room temperature and at a pressure of 900 to 1100 hPa, although it can also be carried out at higher or lower temperatures and also at higher or lower pressures.

The invention also relates to organo(poly)siloxane compositions which are crosslinkable with the elimination of alcohols to give elastomers, characterised in that they contain at least one organo(poly)siloxane containing terminal siloxane units having organyloxy and hydrogen groups.

The organo(poly)siloxanes used according to the invention and containing terminal siloxane units having organyloxy and hydrogen groups are preferably those of the formula

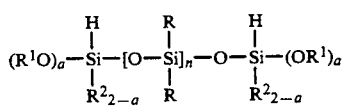 (I)

in which

R, $R^1$, $R^2$ and a have one of the abovementioned meanings and n is an integer of at least 2, preferably between 10 and 2500, particularly preferably between 10 and 2000, in particular between 20 and 1500.

The organo(poly)siloxanes of the formula (I) according to the invention have a viscosity of preferably 2 to $10^7$ mPa·s, particularly preferably 1000 to 400000 mPa·s, at a temperature of 23° C.

The organo(poly)siloxanes used according to the invention and containing terminal siloxane units having organyloxy and hydrogen groups are particularly preferably α,ω-bis(hydrogendiethoxysiloxy)dimethyl(poly)siloxanes and α,ω-bis(hydrogenethoxymethylsiloxy)dimethyl(poly)siloxanes and mixtures thereof, in particular α,ω-bis(hydrogendiethoxysiloxy)dimethyl(poly)siloxane.

In addition to the organo(poly)siloxane used according to the invention containing terminal siloxane units having organyloxy and hydrogen groups, the organo(poly)siloxane compositions according to the invention which are crosslinkable with the elimination of alcohols to give elastomers preferably contain at least one hydridofunctional organyloxysilane, preferably one of the formula

 (IV)

in which $R^3$ has one of the meanings given for $R^1$, $R^4$ has one or the meanings given for $R^2$ and b is 2 or 3. If the organo(poly)siloxane used according to the invention and containing terminal siloxane units having hydrogen and organyloxy groups is a low-molecular-weight organo(poly)siloxane, such as, for example, one having a molecular weight of less than 35000 g/mol, the silane of the formula (IV) can also be omitted in the crosslinkable organo(poly)siloxane compositions according to the invention.

Examples of hydridofunctional organyloxysilanes according to formula (IV) are triethoxysilane, trimethoxysilane, tri(n-propyloxy)silane, methyldiethoxysilane, methyldimethoxysilane and methyldi(n-propyloxy)silane.

The constituents other than the organo[poly)siloxane used according to the invention and containing terminal siloxane units having organyloxy and hydrogen groups and the optionally used hydridofunctional organyloxysilane in the organo(poly)siloxane compositions according to the invention which are crosslinkable with the elimination of alcohols to give elastomers can be the same as could have previously been present in the organo(poly)siloxane compositions which are crosslinkable with the elimination of alcohols to give elastomers, basic constituents being less suitable since they reduce the storage stability.

Examples of these other constituents are silanes of the formula

 (V)

in which $R^5$ has one of the meanings given for $R^1$, $R^6$ has one of the meanings given for $R^2$ and c is 0 or 1, or their partial hydrolysates, such as hexamethoxydisiloxane, condensation catalysts, reinforcing inorganic fillers, non-reinforcing inorganic fillers, pigments, soluble dyes, odoriferous substances, plasticisers, such as dimethylpolysiloxanes which are liquid at room temperature and end-blocked by trimethylsiloxy groups or phosphoric esters, fungicides, resin-like organopolysiloxanes, including those comprising $(CH_3)_3SiO_{1/2}$ and $SiO_{4/2}$ units, purely organic resins, such as homo- or mixed polymers of acrylonitrile, styrene, vinyl chloride or propylene, corrosion inhibitors, polyglycols, which may be esterified and/or etherified, oxidation inhibitors, heat stabilisers, solvents, agents for influencing the electrical properties, such as conductive carbon black, flameproofing agents, light stabilisers and agents for lengthening the time to skin formation, such as silanes having an SiC-bound mercaptoalkyl radical, cell-forming agents, for example azodicarbonamide, thixotropic agents, adhesion promoters, such as, for example, aminoalkyl- or glycidoxypropyl-functional silanes or organo(poly)siloxanes, and scavengers.

The organo(poly)siloxane compositions according to the invention which are crosslinkable with the elimination of alcohols preferably contain, in each case relative to the total weight of the crosslinkable organo(poly)siloxane composition, (A) 20 to 80 per cent by weight, preferably 30 to 70 per cent by weight, of an organo(poly)siloxane containing terminal siloxane groups having organyloxy and hydrogen groups according to formula (I), (B) 0 to 30 per cent by weight, preferably 2 to 10 per cent by weight, of a hydridofunctional organyloxysilane according to formula (IV), (C) 0 to 5 per cent by weight, preferably 0 to 2 per cent by weight, of a condensation catalyst, (D) 0 to 70 per cent by weight, preferably 8 to 60 per cent by weight, of filler, (E) 0 to 60 per cent by weight, preferably 0 to 50 per cent by weight, of plasticiser, (F) 0 to 20 per cent by weight, preferably 0.5 to 10 per cent by weight, of adhesion promoter, (G) 0 to 20 per cent by weight, preferably 0 to 7 per cent by weight, of scavenger and (H) if desired, further substances, such as, for example, dyes, fungicides and thixotropic agents.

Component (B) is preferably a hydridofunctional diethoxy or triethoxysilane and mixtures thereof, the preferred mixing ratio being determined by the desired mechanical properties.

The compositions according to the invention can contain, as the condensation catalyst (C), any desired condensation catalysts which previously could also have been present in compositions which are stable on storage in the absence of water and are crosslinked in the presence of water at room temperature to give elastomers, such as, for example, (organo)metal compounds, acid catalysts, such as, for example, carboxylic acids, and basic catalysts, such as, for example, amines.

Of these condensation catalysts, acid catalysts, such as, for example, carboxylic acids are preferred, carboxylic acids such as, for example, hexanoic acid, 2-ethylhexanoic acid, lauric acid, malonic acid and oleic acid being particularly preferably used.

Furthermore, compounds which only develop their effect as acidic catalysts in the presence of water, such as, for example, carboxylic anhydrides and acyloxysilanes, such as acetoxysilanes, can also be used as constituent (C).

Examples of fillers (D) used in the organo(poly)siloxane compositions according to the invention are nonreinforcing fillers, i.e. fillers having a BET surface area of up to 50 m²/g, such as quartz, diatomaceous earth, calcium silicate, zirconium silicate, zeolites, metal oxide powder, such as aluminium oxides, titanium oxides, iron oxides or zinc oxides or mixed oxides thereof, barium sulphate, calcium carbonate, gypsum, silicon nitride, silicon carbide, boron nitride, glass and plastic powder, such as polyacrylonitrile powder; reinforcing fillers, i.e. fillers having a BET surface area of more than 50 m²/g, such as fumed silica, precipitated silica, carbon black, such as furnace and acetylene carbon black and silicon aluminium mixed oxides having a large BET surface area; fibrous fillers, such as asbestos, and plastic fibres. The fillers mentioned can be made hydrophobic, for example by treatment with organosilanes or -siloxanes or with stearic acid or by etherification of hydroxyl groups to alkoxy groups.

Examples of plasticisers (E) used in the organo(poly)siloxane compositions according to the invention are dimethylpolysiloxanes which are liquid at room temperature and end-blocked by trimethylsiloxy groups and high-boiling hydrocarbons.

Examples of adhesion promoters (F) used in the organo(poly)siloxane compositions according to the invention are silanes and organo(poly)siloxanes having functional groups, such as, for example, aminoalkyl, glycidoxypropyl or methacryloxypropyl radicals.

Suitable scavengers (G) are all compounds which are capable of scavenging molecules which reduce the storage stability of the organo(poly)siloxane compositions according to the invention, such as, for example, water, alcohol or silanols.

Examples of scavengers (G) of this type are silanes of the formula $$R_{4-d}^7 SiY_d \qquad (VI)$$

in which $R^7$ can be identical or different and has one of the meanings of R, Y is an easily detachable group, such as, for example,

—OCR′,

—NR″$_2$ and —OR‴, in which R′, R″ and R‴ can each be identical or different and denote an organic radical, d is 1, 2, 3 or 4, such as, for example, triacetoxymethylsilane, di(N-methylacetamido)dimethylsilane and diacetoxydimethylsilane, and carboxylic anhydrides, carboxylic esters, isocyanates, molecular sieves and concentrated organic compounds in accordance with U.S. Pat. No. 4,489,191 (General Electric Company; issued on Dec. 18, 1989).

The individual constituents of the organo(poly)siloxane compositions according to the invention which are crosslinable with the elimination of alcohols can each be one type of such constituents or a mixture comprising at least two types of such constituents.

To prepare the compositions according to the invention, all constituents of the particular composition can be mixed with one another in any desired order. This mixing is preferably carried out at room temperature. If desired, this mixing can however also be carried out at higher temperatures, for example at temperatures in the range from 35° C. to 135° C. In this mixing, it is preferred to exclude the presence of water as far as possible.

According to a preferred embodiment of the process according to the invention, the compositions according to the invention are prepared by mixing all constituents with one another in any desired order, stirring the mixture in a first step at a temperature of preferably 15° to 80° C., particularly preferably 40° to 50° C., and a pressure of preferably 900 to 1100 hPa for a period of preferably 20 to 90 minutes, particularly preferably 30 to 60 minutes, and then to continue stirring in a second step at a pressure of preferably 0.01 to 100 hPa, particularly preferably 1 to 15 hPa, for a period of preferably 3 to 60 minutes, particularly preferably 5 to 30 minutes, the stirring rate being selected such that the temperature of the composition increases during the stirring without any further addition of heat to a value within the temperature range of 15° C. to 80° C.

The usual water content of the air is sufficient for crosslinking the compositions according to the invention. If desired, the crosslinking can also be carried out at higher or lower temperatures than room temperature, for example at −5° to 10° C. or at 30° to 50° C.

The advantage of the organo(poly)siloxane compositions according to the invention which are crosslinkable with the elimination of alcohols to give elastomers is that they are distinguished by a high crosslinking rate and a high storage stability. A further advantage of the organo(poly)siloxane compositions prepared by the process according to the invention is that they do not show any evolution of hydrogen even after long storage.

The compositions according to the invention can be used for all application purposes for which compositions which are stable on storage in the absence of water and are crosslinked in the presence of water at room temperature to give elastomers can be used.

Accordingly, the compositions according to the invention are highly suitable, for example, as sealing compounds for joints, including upright joints, and similar empty spaces of, for example, 10 to 40 mm of clearance, for example of buildings, land, water and air vehicles, or as adhesives or cements, for example in window construction or in the manufacture of aquariums or glass cabinets, and, for example, for the production of protective coatings, including those for surfaces which are constantly exposed to fresh- or seawater, or anti-slip coatings, or rubber elastic mouldings and for the insulation of electric or electronic devices.

The invention also relates to a process for the preparation of organopolysiloxane elastomers by crosslinking compositions which are crosslinkable by an addition reaction of Si-bound hydrogen with SiC-bound organic radicals having an aliphatic carbon-carbon multiple bond, characterised in that the crosslinkable compositions contain at least one organo(poly)siloxane containing terminal siloxane units having organyloxy and hydrogen groups.

The organopolysiloxanes used in the process according to the invention and containing terminal siloxane units having organyloxy and hydrogen groups are preferably α,ω-bis(hydrogendialkoxysiloxy)dimethyl(poly)siloxanes, whose alkoxy groups have 1 to 3 carbon atoms, α,ω-bis(hydrogendiethoxysiloxy)dimethyl(poly)siloxanes being particularly preferred.

The organo(poly)siloxanes used in the process according to the invention of the formula (I) have a viscosity of preferably 2 to 10$^7$, particularly preferably 10 to 1000, in particular 20 to 300, mPa·s at a temperature of 23° C.

The constituents other than the organo(poly)siloxane used according to the invention and containing terminal siloxane units having organyloxy and hydrogen groups of the crosslinkable compositions used in the process according to the invention can be the same as those which previously could be present in the compositions used for the preparation of organopolysiloxane elastomers and crosslinkable by adduct formation of Si-bound hydrogen with SiC-bound radicals having an aliphatic carbon-carbon multiple bond.

Apart from the organo(poly)siloxane used according to the invention and containing terminal siloxane units having organyloxy and hydrogen groups (a), the principal components are (b) organopolysiloxanes containing SiC-bound radicals having an aliphatic carbon-carbon multiple bond, preferably those of the formula $$R_2^8R^9SiO(R_2^8SiO)_eSiR^9R_2^8 \tag{VII}$$

in which $R^8$ denotes identical or different monovalent, SiC-bound organic radicals which are free from an aliphatic carbon-carbon multiple bond, $R^9$s denotes identical or different, monovalent SiC-bound radicals having an aliphatic carbon-carbon multiple bond and e is an integer having such a value that the average viscosity at 25° C. is 100 to 10$^6$ mPa·s, (c) compounds containing SiC-bound hydrogen, preferably linear, cyclic or branched organopolysiloxanes comprising units of the formula $$R^{10}_f H_h SiO_{\frac{4-f-h}{2}} \tag{VIII}$$

in which $R^{10}$ has one of the meanings given for $R^8$, f is 0, 1, 2 or 3, h is 0 or 1, and the sum of f and h is 0, 1, 2 or 3, with the proviso that at least two Si-bound hydrogen atoms are present per molecule, and (d) a catalyst promoting the addition reaction of Si-bound hydrogen with SiC-bound radicals having an aliphatic carbon-carbon multiple bond.

The radicals $R^8$ and $R^{10}$ are preferably hydrocarbon radicals having 1 to 8 carbon atoms which are free of an aliphatic carbon-carbon multiple bond and can be substituted by halogen atoms.

The radicals $R^8$ and $R^{10}$ are particularly preferably alkyl radicals having 1 to 8 carbon atoms and a phenyl radical.

The radical $R^9$ is preferably a hydrocarbon radical having 2 to 12 carbon atoms and an aliphatic carbon-carbon multiple bond.

The radical $R^9$ is particularly preferably a vinyl radical.

The Si-bound hydrogen is preferably present in amounts of 1.1 to 2.0 as Si-bound hydrogen atoms per SiC-bound radical having an aliphatic carbon-carbon multiple bond.

The constituents (b) and (c) used in the process according to the invention are commercial products or can be prepared by methods customary in silicon chemistry. See, for example, W. Noll, "Chemistry and Technology of Silicones", Academic Press, Orlando, 1968, page 191 ff and M. Wick, G. Kreis, F.-H. Kreuzer, "Silicone" (Silicones), in "Ullmanns Encyklopädie der technischen Chemie" (Ullmann's Encyclopaedia of Industrial Chemistry), Verlag Chemie, Weinheim, 4th Edition, 1982, Vol. 21, page 511 ff.

In the context of the process according to the invention, the catalysts used (d) can be the same as have previously also been used for the addition reaction of Si-bound hydrogen atoms with SiC-bound radicals having an aliphatic multiple bond. They are mainly metals of subgroup 8 and inorganic and organic compounds thereof, platinum and its compounds being preferred.

Examples of catalysts of this type are finely divided elemental platinum deposited on an inert support, such as activated carbon, $SiO_2$ or $Al_2O_3$, according to U.S. Pat. No. 2,970,150 (D. L. Bailey, Union Carbide Corporation; issued on Jan. 31, 1961), hexachloroplatinic acid according to U.S. Pat. No. No. 2,823,218 (J. L. Speier, Dow Corning Corporation; issued on Feb. 11, 1958) and chloroplatinate derived therefrom, platinum complexes of the type L . PtCl$_2$, in which L is a linear or cyclic monoolefin, such as ethene, propene and cyclohexene, according to U.S. Pat. No. 3,159,601 and U.S. Pat. No. 3,159,662 (Bruce A. Ashby, General Electric Company; both issued on Dec. 1, 1964), latinum complexes of the type L PtCl$_2$, in which L is a cyclic diolefin, such as 1,5-cyclooctadiene, norbornadiene and cyclopentadiene, according to JP-A2 79/76,529 and JP-A2 79/76,530 (Masatoshi Arai, Shin-Etsu Chemical Industry Co., Ltd; both issued on Jun. 19, 1979) and U.S. Pat. No. 4,276,252 (G. Kreis, Wacker-Chemie GmbH, issued on Jun. 30, 1981) or is a cyclic polyolefin according to the German application of file number P 39 06 514.6 (G. Wenski, Consortium für elektrochemische Industrie GmbH; filed on Mar. 1, 1989), platinum vinylsiloxane complexes according to U.S. Pat. No. 3,814,730 (B. D. Karstedt, General Electric Company; issued on Jun. 4, 1974) and acetylacetonate complexes of platinum according to U.S. Pat. No. 4,177,341 (G. Kreis, Consortium für elektrochemische Industrie GmbH; issued on Dec. 4, 1979).

In the compositions used in the process according to the invention, one type of catalyst (d) can be used. However, it is also possible to use a mixture comprising at least two different types of these catalysts. Likewise, one type of constituent (a) but also a mixture comprising at least two different types of constituent (a), one type of constituent (b) but also a mixture comprising at least two different types of constituent (b), and finally one type of constituent (c) but also a mixture comprising at least two different types of constituent (c) can be present in the compositions used in the process according to the invention.

The amounts of catalyst used in the context of the process according to the invention can be the same as in the previously known processes for forming an adduct of Si-bound hydrogen with SiC-bound radicals having an aliphatic multiple bond in the presence of a catalyst. These amounts are preferably 0.1 to 500 ppm by weight, in each case calculated as elemental platinum and based on the total weight of constituents (b) and (c).

The organo(poly)siloxane containing terminal siloxane units having organyloxy and hydrogen groups (a) is used in the process according to the invention in amounts of a total of 1 to 20 per cent by weight, particularly preferably 2 to 10 per cent by weight, in each case relative to the total weight of constituents (b) and (c). If the amount of additive (a) is less than 1 per cent by weight, relative to the total weight of constituents (b) and (c), the adhesion of the elastomers on the substrates can be unsatisfactorily low. If the amount of additive (a) is more than 20 per cent by weight, relative to the total weight of constituents (b) and (c), no more substantial increase in adhesion can be achieved.

The compositions used in the process according to the invention in addition to constituents (a), (b), (c) and (d) preferably contain compounds which release physically or chemically bound water at temperatures above about 23° C. (e).

Examples of compounds (e) of this type are starch, carob seed flour, gelatin, methylcellulose and alginic acid and mixtures thereof, alginic acid and potato starch being preferably used.

In the process according to the invention, compounds (e) are used preferably in amounts of 0 to 50 per cent by weight, particularly preferably 8 to 30 per cent by weight, in each case relative to the total weight of constituent (a).

Furthermore, the compositions used in the process according to the invention can in addition to constituents (a), (b), (c), (d) and (e) contain substances which could also be present in the previously known compositions used for the preparation of organopolysiloxane elastomers and are crosslinkable by adduct formation of Si-bound hydrogen with an aliphatic carbon-carbon multiple bond in addition to an organopolysiloxane having Si-bound hydrogen, organopolysiloxanes containing SiC-bound radicals having an aliphatic carbon-carbon multiple bonds and a catalyst, basic additives being unsuitable due to the terminal siloxane units contained in constituent (a) and having organyloxy and hydrogen groups.

Examples of these further additional substances are inorganic fillers having a BET surface area of at least 50 m$^2$/g, such as fumed silica or precipitated silica having a BET surface area of at least 50 m$^2$/g, inorganic fillers having a surface area of less than 50 m$^2$/g, such as ground quartz, glass fibres, precipitated silica having a BET surface area of less than 50 m$^2$/g, or diatomaceous earth, substances imparting electric conductivity, such as acetylene carbon black, pigments, soluble dyes, plasticisers, organopolysiloxane resins, such as those comprising units of the formula $R^{11}R_2^{12}SiO_{\frac{1}{2}}$, $R^{12}_3SiO_{\frac{1}{2}}$ and $SiO_{4/2}$, $R^{11}$ having one of the meanings given above for $R^9$ and $R^{12}$ having one of the meanings given above for $R^8$, purely organic resins, such as polyvinyl chloride powder, other agents for improving adhesion of the elastomers on the substrates than additive (a) used according to the invention and agents delaying or regulating crosslinking, such as monoallyl maleate, benzotriazole, 1,3-divinyltetramethyldisiloxane, 1-ethinylcyclohexanol and 2-methyl-3-butyn-2-ol.

The preparation of the compositions used in the process according to the invention and crosslinkable by adduct formation of Si-bound hydrogen with SiC-bound radicals having an aliphatic carbon-carbon multiple bond can take place by mixing their constituents by processes customary for the preparation of compositions which are crosslinkable by adduct formation of Si-bound hydrogen with SiC-bound radicals having an aliphatic carbon-carbon multiple bond. If the crosslinkable compositions used in the process according to the invention are prepared from more than one component, which is very often the case with compositions which are crosslinkable at as low as room temperature, in which in general one component contains constituent (b) and constituent (d), a further component contains constituent (c), or constituent (d) is present in a third component, it being immaterial in which component constituent (a) is present or whether constituent (a) is admixed with a mixture comprising all the remaining constituents, as long as this mixture is not crosslinked too rapidly. Components containing constituent (a) should not be stored in the presence of moisture.

The temperatures and pressures used in connection with the process according to the invention can be the same as in the previously known processes for adduct formation of Si-bound hydrogen with SiC-bound radicals having an aliphatic carbon-carbon multiple bond. These temperatures are preferably between 15° and 150° C. and the pressures between 900 and 1100 hPa, temperatures between 40° and 80° C. being particularly preferred. If desired, higher or lower pressures can also be used.

Depending on the composition of the crosslinkable compositions used according to the invention, the crosslinking is completed after 30 minutes to a few hours.

Examples of substrates on which elastomers can be produced by the process according to the invention and on which the elastomers have very good adhesion even without prior priming are silicate materials, such as porcelain, stoneware, enamel and glass, metals, such as steel, aluminium and copper, and wood and plastics, such as polyvinyl chloride, polycarbonates and glass fibre reinforced epoxy resin. However, pretreatment of the substrates with conventional primers, such as are described, for example, in U.S. Pat. No. 4,900,362 (Shinetsu Chemical Company, issued on Feb. 13, 1990) and EP-A 241,759 (Dow Corning Corp., issued on Oct. 21, 1987), or with low temperature plasmas can additionally reinforce adhesion.

The process according to the invention is suitable, for example, for pouring or embedding, for example, electric or electronic or photovoltaic structural components for sealing, for producing coatings, for bonding, for example when joining glass plates or plastic sheets with one another and for insulating electric conductors. The process according to the invention has the advantage that the organopolysiloxane elastomers have in general very good adhesion on the substrates on which they are produced. In the preparation according to the invention of the elastomers, the adhesion takes effect very rapidly even at relatively low temperatures, such as, for example, at 40° to 80° C. In particular the combined use of an organo(poly)siloxane containing terminal siloxane units having organyloxy and hydrogen groups and compounds which release physically or chemically bound water above about 23° C., in compositions which are crosslinkable by adduct formation of Si-bound hydrogen with SiC-bound radicals having an aliphatic carbon-carbon multiple bond substantially increases the adhesion on the particular substrate during the preparation of the elastomers.

The use according to the invention of organo(poly)-siloxane containing terminal siloxane units having organyloxy and hydrogen groups in compositions which are crosslinkable by adduct formation of Si-bound hydrogen with SiCbound organic radicals having an aliphatic carbon-carbon multiple bond has the advantage that the organo(poly)siloxane containing terminal siloxane units having organyloxy and hydrogen groups can be readily mixed with the other constituents of these crosslinkable compositions and in general does not show any undesirable interactions with these other constituents.

In the examples described below, all viscosity data refer to a temperature of 25° C. Unless stated otherwise, the examples below are carried out at ambient pressure, i.e. at about 1000 hPa, and at room temperature, i.e. at about 23° C., or at a temperature which is reached without additional heating or cooling upon combining the reactants at room temperature. Furthermore, all parts and percentages are by weight, unless stated otherwise.

In the examples which follow, the Shore A hardness is determined according to DIN (German Technical Standard) 53 505-87, the tear strength, the tear elongation and the modulus (tensile strength after 100% of elongation) are each determined according to DIN 53504-85SI and the tear propagation strength according to ASTM D624B-73.

Furthermore, the following abbreviations are used:
Et—ethyl radical
Me—methyl radical
rpm—revolutions per minute.

EXAMPLE 1 a)
1036 g of α,ω-dihydroxydimethylsiloxane having on average 70 dimethylsiloxy units, 132 g of triethoxysilane (Silicon Compounds Register and Review; Petrarch Systems: Silane and Silicones, ABCR Karlsruhe GmbH and Co., D-7500 Karlsruhe) and 11.6 g of 50 % by weight calcium octoate, dissolved in 2-ethylhexanoic acid (which can be purchased from Abshagen & Co. KG., D-2000 Hamburg) are thoroughly mixed with the exclusion of moisture, heated to 130° C., stirred at 130° C. for one hour, and the volatile portions are removed by evacuation for a short period (15 minutes/ 5 mbar). The mixture is then filtered through cellulose, giving 1047 g of a clear, colourless oil having a viscosity of 90 mPa·s, which has $^{29}$Si NMR spectroscopy of more than 95% of H-Si(OEt)$_2$ terminal groups.

b)
The organopolysiloxane obtained under a) is exposed on a glass plate to air humidity. After 60 minutes, a surface forms which is dry to the touch and, after 120 minutes, a completely vulcanised, rubber-elastic, firmly adhering, optically transparent film has been formed.

c)
5 g of the organopolysiloxane obtained under a) and 0.1 ml of water are vigorously mixed using an "Ultra-Turrax" and the mixture is left to stand sealed. After 8 minutes, a rubber-elastic composition has been formed.

EXAMPLE 2

The procedure described in Example 1 under a) is repeated, except that the reaction temperature is 60° C. instead of 130° C., giving 1050 g of a clear, colourless oil having a viscosity of 80 mPa·s, which by $^{29}$Si NMR spectroscopy has more than 95% of H-Si(OEt)$_2$ terminal groups.

EXAMPLE 3 a)
51.8 g of α,ω-dihydroxydimethylpolysiloxane having on average 70 dimethylsiloxy units, 6.56 g of triethoxysilane and 0.58 g of 2-ethylhexanoic acid are thoroughly mixed with the exclusion of moisture, heated to 130° C., stirred at 130° C. for one hour, and the volatile components are removed by evacuation for a short period (15 minutes/7 mbar). The mixture is then filtered through cellulose, giving 40 g of a clear, colourless oil having a viscosity of 95 mPa·s, which by $^{29}$Si NMR spectroscopy has more than 95% of H-Si(OEt)$_2$ terminal groups.

b)
The organopolysiloxane obtained under a) is exposed on a glass plate to air humidity. After 15 minutes, a surface forms which is dry to the touch and, after 25 minutes, a completely vulcanised, rubber-elastic, firmly adhering, optically transparent film has been formed.

EXAMPLE 4 a)
The procedure described in Example 3 under a) is repeated, except that 0.60 g of coumaranone (which can be purchased from Janssen Chimica, D-4054 Nettetal 2) is used instead of 0.58 g of 2-ethylhexanoic acid and the evacuation is carried out at 5 mbar instead of 7 mbar, giving 50 g of a clear, colourless oil having a viscosity of 85 mPa·s, which by $^{29}$Si NMR spectroscopy

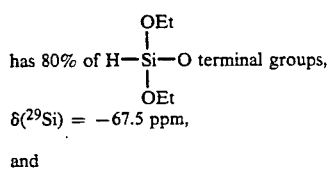

has 80% of H—Si—O terminal groups, $\delta(^{29}Si) = -67.5$ ppm, and

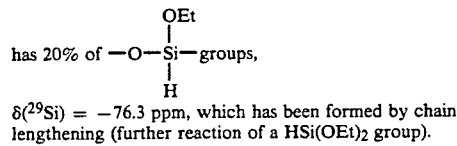

has 20% of —O—Si— groups, $\delta(^{29}Si) = -76.3$ ppm, which has been formed by chain lengthening (further reaction of a HSi(OEt)$_2$ group).

b)

The amounts of 2-ethylhexanoic acid listed in Table 1 are added to 10 g each of the organopolysiloxanes obtained under a), and the mixture is exposed on a glass plate to air humidity.

TABLE 1

| Experiment | 2-Ethylhexanoic acid (g) | T$_1$[min] | T$_2$[min] |
|---|---|---|---|
| 4b1 | — | no crosslinking[1] | |
| 4b2 | 0.02 | 10 | 20 |
| 4b3 | 0.05 | 10 | 20 |
| 4b5 | 0.20 | 5 | 12 |

[1]after 24 hours
T$_1$: time to skin formation
T$_2$: time for complete crosslinking c)

5 g each of the organopolysiloxane obtained under a) are vigorously mixed with the amounts of 2-ethylhexanoic acid listed in Table 2 and 0.1 ml of water using an "Ultra-Turrax", and the mixture is left to stand sealed. After the times T$_3$ listed in Table 2, a rubber-elastic composition is obtained in each case.

TABLE 2

| Experiment | 2-Ethylhexanoic acid (g) | T$_3$[min] |
|---|---|---|
| 4c1 | — | no crosslinking[1] |
| 4c2 | 0.01 | 14 |
| 4c3 | 0.025 | 10 |
| 4c4 | 0.05 | 4 |
| 4c5 | 0.1 | 1 |

[1]after 24 hours d)

The amounts of 2-ethylhexanoic acid listed in Table 3 are added to 10 g each of the organopolysiloxane obtained under a), and the mixture is stored at a temperature of 100° C. with the exclusion of moisture for 16 hours. After the high-temperature storage, the composition is exposed on a glass plate to air humidity.

TABLE 3

| Experiment | 2-Ethylhexanoic acid (g) | T$_1$[min] | T$_2$[min] |
|---|---|---|---|
| 4d1 | 0.02 | 15 | 30 |
| 4d2 | 0.20 | 3 | 15 |

T$_1$: time to skin formation
T$_2$: time for complete crosslinking e)

The amounts of 2-ethylhexanoic acid listed in Table 4 are added to 5 g each of the organopolysiloxane obtained under a) and the mixture is stored at a temperature of 100° C. with the exclusion of moisture for 16 hours. After the high-temperature storage, 0.1 ml of water are vigorously mixed using an "Ultra-Turrax", and the mixture is left to stand sealed. After the times T$_3$ listed in Table 4, a rubber-elastic composition is obtained in each case.

TABLE 4

| Experiment | 2-Ethylhexanoic acid (g) | T$_1$[min] |
|---|---|---|
| 4e1 | 0.01 | 14 |
| 4e2 | 0.10 | 2 |

EXAMPLE 5

51.8 g of α,ω-dihydroxydimethylpolysiloxane having on average 70 dimethylsiloxy units, 6.56 g of trimethoxysilane (Silicon Compounds Register and Review; Petrarch Systems: Silane and Silicones, ABCR Karlsruhe GmbH and Co., D-7500 Karlsruhe) and 0.58 g of coumarin are thoroughly mixed with the exclusion of moisture, heated to 130° C., stirred at 130° C. for one hour, and the volatile portions are removed by evacuation for a short period (15 minutes/5 mbar). The mixture is then filtered through cellulose, giving 40 g of a clear, slightly yellowish oil having a viscosity of 80 mPa·s, which by $^{29}$Si NMR spectroscopy

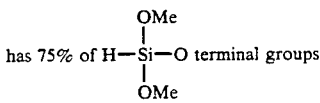

has 75% of H—Si—O terminal groups and

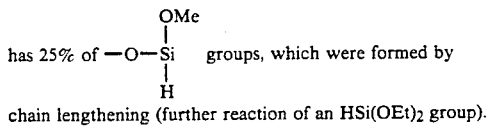

has 25% of —O—Si groups, which were formed by chain lengthening (further reaction of an HSi(OEt)$_2$ group).

EXAMPLE 6

51.8 g of α,ω-dihydroxydimethylpolysiloxane having on average 70 dimethylsiloxy units, 6.56 g of triethoxysilane and 0.60 g of dihydrocoumarin are thoroughly mixed with the exclusion of moisture, heated to 100° C., stirred at 100° C. for one hour, and the volatile components are removed by evacuation for a short period (15 minutes/ 1 mbar). The mixture is then filtered through cellulose, giving 50 g of a clear, colourless oil having a viscosity of 80 mPa·s, which by $^{29}$Si NMR spectroscopy has more than 90% of H-Si(OEt)$_2$ terminal groups.

EXAMPLE 7

51.8 g of α,ω-dihydroxydimethylpolysiloxane having on average 60 dimethylsiloxy units, 6.60 g of triethoxysilane and 0.58 g of pentanedione are thoroughly mixed with the exclusion of moisture, heated to 100° C., stirred at 100° C. for one hour, and the volatile components are removed by evacuation for a short period (15 minutes/ 1 mbar). The mixture is then filtered through cellulose, giving 52 g of a clear, colourless oil having a viscosity of 70 mPa·s, which by $^{29}$Si NMR spectroscopy has 100% of H-Si(OEt)$_2$ terminal groups.

EXAMPLE 8

The procedure described in Example 7 is repeated, except that 0.58 g of propyl acetate is used instead of 0.58 g of pentanedione, giving 52 g of a clear, colourless oil having a viscosity of 65 mPa·s, which by $^{29}$Si NMR spectroscopy has 100% of H-Si-(OEt)$_2$ terminal groups.

EXAMPLE 9

The procedure described in Example 7 is repeated, except that 0.58 g of allyl acetoacetate is used instead of 0.58 g of pentanedione, giving 52 g of a clear, colourless oil having a viscosity of 70 mPa·s, which by $^{29}$Si NMR spectroscopy has 100% of H-Si-(OEt)$_2$ terminal groups.

EXAMPLE 10

The procedure described in Example 7 is repeated, except that 0.58 g of 2,6-di-tert-butyl-4-methylphenol is used instead of 0.58 g of pentanedione, giving 48 g of a clear, colourless oil having a viscosity of 75 mPa·s, which by $^{29}$Si NMR spectroscopy has 100% of H-Si-(OEt)$_2$ terminal groups.

COMPARATIVE EXAMPLE 1

10 g of an α,ω-triethoxysilyldimethylpolysiloxane having on average 60 dimethylsiloxy units, which has been prepared by the procedure described in Example 1 under a), except that tetraethoxysilane is used instead of triethoxysilane, are mixed with 0.05 g of 2-ethylhexanoic acid, and the mixture is exposed on a glass plate to air humidity. No crosslinking takes place over a period of 24 hours.

EXAMPLE 11

The procedure described in Example 3 under a) is repeated, except that α,ω-dihydroxydimethyl/methylvinylcopolysiloxane having on average 70 siloxy units and a vinyl content of 5 mol per cent, which can be prepared from the corresponding silanes by cohydrolysis and cocondensation (see, for example, Encycl. Polym. Sci. 15 (1989) 236), is used instead of α,ω-dihydroxydimethylpolysiloxane having on average 60 dimethylsiloxy units. 40 g of a clear, colourless oil having a viscosity of 80 mPa·s, are obtained, which by $^{29}$Si NMR spectroscopy has more than 95% of H-Si-(OEt)$_2$ terminal groups.

EXAMPLE 12

The procedure described in Example 3 under a) is repeated, except that α,ω-dihydroxydimethyl/methylphenylcopolysiloxane having on average 70 siloxy units and a phenyl content of 5 mol per cent, which can be prepared from the corresponding silanes by cohydrolysis and cocondensation (see, for example, Encycl. Polym. Sci. 15 (1989) 236), is used instead of α,ω-dihydroxydimethylpolysiloxane having on average 60 dimethylsiloxy units. 49 g of a clear, colourless oil having a viscosity of 80 mPa·s, are obtained, which by $^{29}$Si NMR spectroscopy has more than 95% of H-Si-(OEt)$_2$ terminal groups.

EXAMPLE 13

A) Preparation of α,ω-di(diethoxyhydrogen)dimethylpolysiloxane (polymer I)

On a rotary evaporator, 500 g of an α,ω-dihydroxydimethylpolysiloxane having a viscosity of about 80,000 mPa·s and on average 900 to 1000 dimethylsiloxy units are heated together with 20 g of triethoxysilane and 1.6 g of 2-ethylhexanoic acid to 70° C. under nitrogen for 30 minutes. Excess silane is then distilled off at a pressure of 0.1 to 1.5 kPa. The $^{29}$Si NMR spectrum shows that the end-blocking of the silanol groups has proceeded quantitatively.

In a 5 l planetary mixer (FH6-S type from Drais-Werke, D-6800 Mannheim), 52 parts of polymer I, 30 parts of α,ω-di(trimethylsiloxy)dimethylpolysiloxane having a viscosity of about 100 mPa·s, 14.5 parts of fumed silica (obtainable as HDK H 15 from Wacker-Chemie GmbH, D-8000 Munich) and 0.3 part of 2-ethylhexanoic acid are mixed homogeneously at a rate of 120 rpm over a period of 5 minutes. The composition thus obtained is filled into tubes with the exclusion of moisture and stored at a temperature of 50° C. The storage stability data are summarised in Table 5.

The composition thus obtained is exposed to air humidity after one day and 30 days of storage. The time to formation of a dry surface (time to skin formation) is shown in Table 5.

EXAMPLE 14

The procedure given in Example 13 is repeated, except that 14.0 parts instead of 14.5 parts of fumed silica are used and additionally 5.0 parts of triethoxysilane are added. The storage stability data and time to skin formation can be found in Table 5.

EXAMPLE 15

The procedure described in Example 14 is repeated, except that the mixing of the constituents is carried out at a rate of 160 rpm for 35 minutes and at a temperature of 45° C. instead of at a rate of 120 rpm for 5 minutes, the stirring of the mixture being subsequently continued at a rate of 160 rpm at a pressure of 0.1 to 1.5 kPa for another 10 minutes. The storage stability data and time to skin formation can be found in Table 5.

EXAMPLE 16

In a 5 l planetary mixer (FH6-S type from Drais-Werke, D-6800 Mannheim), 51 parts of the polymer I described in Example 13 under A), 30 parts of α,ω-di(trimethylsiloxy)dimethylpolysiloxane having a viscosity of 100 mPa·s, 6 parts of triethoxysilane, 0.3 part of 2-ethylhexanoic acid, 35 parts of dolomite (obtainable under the name Microdol S from Norwegian Talc Minerals A. S., N-5355 Knarrevik) and 12 parts of fumed silica (obtainable as H 15 from Wacker-Chemie GmbH, D-8000 Munich) are mixed at a rate of 120 rpm over a period of 5 minutes. Further procedures are as described in Example 13. The storage stability data and time to skin formation can be found in Table 5.

EXAMPLE 17

The procedure described in Example 16 is repeated, except that the mixing of the constituents is carried out at a rate of 160 rpm at a temperature of 45° C. and at a pressure of 0.1 to 1.5 kPa for 10 minutes instead of at a rate of 120 rpm for 5 minutes. The storage stability data and time to skin formation can be found in Table 5.

EXAMPLE 18

The procedure described in Example 16 is repeated, except that the mixing of the constituents is carried out at a rate of 160 rpm at a temperature of 45° C. for 35 minutes instead of at a rate of 120 rpm for 5 minutes, the stirring of the mixture being subsequently continued for another 10 minutes at a rate of 160 rpm and at a pressure of 0.1 to 1.5 kPa. The storage stability data and time to skin formation can be found in Table 5.

TABLE 5

| Example | $t_1$[min] 1 d | 30 d | $t_2$ [d] |
|---|---|---|---|
| 13[2] | — | — | — |
| 14 | 4 | — | 1 |
| 15 | 6 | 7 | —[3] |
| 16 | — | — | 1 |
| 17 | 9 | — | 5-7 |
| 18 | 8 | 10 | —[4] |

$t_1$: Time to skin formation after one day and 30 days of storage at 50° C.
$t_2$: Time after the preparation at which evolution of hydrogen can be observed.
[2] Composition stiffens within a day.
[3] Over an observation period of 150 days no evolution of hydrogen can be observed.
[4] Over an observation period of 30 days no evolution of hydrogen can be observed.

EXAMPLE 19

α,ω-Dihydroxydmethylpolysiloxane having a viscosity of about 20,000 mPa·s is heated together with 3% of triethoxysilane, relative to the weight of the α,ω-dihydroxydimethylpolysiloxane used, at 80° C. for 1 hour. The mixture is then thoroughly heated on a rotary evaporator at a temperature between 85° and 100° C. and a pressure of 1.0 kPa. After excess silane and cleavage products have been removed, 5% of triethoxysilane, relative to the weight of the α,ω-dihydroxydimethylpolysiloxane used, are again added. The additives listed in Table 6 are then added to each of the silane-siloxane mixture obtained.

A portion of the composition resulting in each case is exposed to air humidity. The time to formation of a dry surface (time to skin formation) can be found in Table 6. A different portion of these compositions is filled into tubes with the exclusion of moisture and stored at a temperature of 50° C. The storage stability data can be found in Table 6.

TABLE 6

| Example | Addition in %[5] | $t_1$ | $t_2$ [d] |
|---|---|---|---|
| 19a | — | 8-24 h | —[7] |
| 19b | 1% 2-Ethylhexanoic acid | 35 min | 30 |
| 19c | 0.5% Acetone | 3-5 d | —[8] |
| 19d | 0.5% Oleic acid | 20 min | —[8] |
| 19e | 0.5% Cinnamic acid | 50 min | —[8] |
| 19f | 0.15% Sulfanilic acid | 2 d | —[8] |
| 19g | 0.5% Sulfanilic acid | 4-20 h | —[8] |
| 19h | 0.1% Di-n-butyltin diacetate | —[6] | 1 |
| 19i | 0.1% Triethylamine | 5-24 h | 4 |
| 19k | 0.1% Diethylamine | 5-24 h | 3 |
| 19l | 0.1% Triisononylamine | 5-24 h | 14 |
| 19m | 0.5% Acetic acid | 50 min | —[9] |
| 19n | 0.5% Acetic anhydride | 1-3 d | —[9] |
| 19o | 0.5% N-Methylacetamide | 3-7 d | 22 |

[5] relative to the weight of the α,ω-dihydroxydimethylpolysiloxane used.
[6] Tube breaks within a day.
[7] Over an observation period of 74 days no evolution of hydrogen can be observed.
[8] Over an observation period of 55 days no evolution of hydrogen can be observed.
[9] Over an observation period of 61 days no evolution of hydrogen can be observed.
$t_1$: time to skin formation
$t_2$: time after the preparation at which evolution of hydrogen can be observed.

EXAMPLE 20

In a 5 l planetary mixer (FH6-S type from Drais-Werke, D-6800 Mannheim), 51 parts of the polymer I described in Example 13 under A), 30 parts of α,ω-di(-trimethylsiloxy)dimethylpolysiloxane having a viscosity of 100 mPa·s, 6 parts of triethoxysilane, 0.60 part of oleic acid, 35 parts of dolomite (obtainable under the name Microdol S from Norwegian Talc Minerals A. S., N-5355 Knarrevik) and 12 parts of fumed silica (obtainable as H 15 from Wacker-Chemie GmbH, D-8000 Munich) and in each case 1.35 parts of the substance listed in Table 7 are mixed at a rate of 160 rpm over a period of 35 minutes at a temperature of 45° to 50° C., stirring of the mixture being subsequently continued for another 10 minutes at a rate of 160 rpm at a pressure of 1 to 2 kPa. The compositions thus obtained are processed as described in Example 13. The storage stability data and time to skin formation can be found in Table 7.

TABLE 7

| Example | Additive | $t_1$[min] 1 d | 30 d | |
|---|---|---|---|---|
| 20a | — | 17 | 17 | — |
| 20b | 3-Triethoxysilylpropyl-succinic anhydride[10] | 5 | 4 | — |
| 20c | Triacetoxymethylsilane | .7 | 6 | — |
| 20d | Acetic anhydride | 23 | 20 | — |
| 20e | Di(N-methylacetamido)di-methylsilane[11] | 28 | 36 | + |

− no evolution of hydrogen within 30 days after the preparation.
+ evolution of hydrogen within 30 days after the preparation.
$t_1$: time to skin formation after one day and 30 days of storage at 50° C.
[10] can be purchased from Wacker-Chemie GmbH under the name GF 20.
[11] prepared by reacting dichlorodimethylsilane with the sodium salt of N-methylacetamide according to U.S. Patent Specification 3,766,127 (Dow Corning Corp.).

EXAMPLE 21

In a 5 l planetary mixer (FH6-S type from Drais-Werke, D-6800 Mannheim), 51 parts of the polymer I described in Example 13 under A), 30 parts of α,ω-di(-trimethylsiloxy)dimethylpolysiloxane having a viscosity of 100 mPa·s, 6 parts of triethoxysilane, 0.60 part of oleic acid, 35 parts of dolomite (obtainable under the name Microdol S from Norwegian Talc Minerals A.S., N-5355 Knarrevik) and 12 parts of fumed silica (obtainable as H 15 from Wacker-Chemie GmbH, D-8000 Munich) are mixed at a rate of 160 rpm over a period of 35 minutes at a temperature of 45° to 50° C., stirring of the mixture being subsequently continued for another 10 minutes at a rate of 160 rpm at a pressure of 1 to 2 kPa. The composition thus obtained is filled into tubes with exclusion of moisture and stored at a temperature of 50° C. Within 30 days after the preparation no evolution of hydrogen can be observed.

The composition thus obtained is used to produce after one day and 30 days, respectively, of storage 2 mm thick films by applying the composition in each case to a polytetrafluoroethylene surface using a trowel and exposing it to air humidity. Two weeks after application, the resulting dry films are tested for their mechanical properties. The mechanical properties data can be found in Table 8.

Time to skin formation [min] after a storage of
1 d: 17
30 d: 17

EXAMPLE 22

Using the procedure described in Example 21, a composition is prepared from 52 parts of the polymer I described in Example 13 under A), 30 parts of α,ω-di(-trimethylsiloxy)dimethylpolysiloxane having a viscosity of 100 mPa·s, 5.20 parts of triethoxysilane, 0.50 part of oleic acid and 13.5 parts of fumed silica (obtainable at H 15 from Wacker-Chemie GmbH, D-8000 Munich). The further procedure is as described in Example 21. Data on the mechanical properties can be found in Table 8.

Time to skin formation [min] after storage of
1 d: 9

30 d: 15

EXAMPLE 23

Using the procedure described in Example 21, a composition is prepared from 52 parts of the polymer I described in Example 13 under A), 30 parts of α,ω-di(-trimethylsiloxy)dimethylpolysiloxane having a viscosity of 100 mPa·s, 5.20 parts of diethoxymethylsilane, 0.40 part of oleic acid and 12.0 part of fumed silica (obtainable as H 15 from Wacker-Chemie GmbH, D-8000 Munich). The further procedure is as described in Example 21. Data on the mechanical properties can be found in Table 8.

Time to skin formation [min] after storage of
1 d: 45
30 d: 40

EXAMPLE 24

A) Preparation of
α,ω-di(ethoxymethylhydrogen)dimethylpolysiloxane
(polymer II)

On a rotary evaporator, 500 g of an α,ω-dihydroxydimethylpolysiloxane having a viscosity of about 80,000 mPa·s and on average 900 to 1000 dimethylsiloxy units are heated together with 40 g of diethoxymethylsilane and 2.5 g of 2-ethylhexanoic acid at 80° C. under nitrogen for 4 hours. Excess silane is then distilled off at a pressure of 0.1 to 1.5 kPa. The $^{29}$Si NMR spectrum shows that the end blocking of the silanol groups has proceeded quantitatively.

Using the procedure described in Example 21, a composition is prepared from 52 parts of polymer II, 30 parts of α,ω-di(trimethylsiloxy)dimethylpolysiloxane having a viscosity of about 100 mPa·s, 5.20 parts of triethoxysilane, 12.0 parts of fumed silica (obtainable as HDK H 15 from Wacker-Chemie GmbH, D-8000 Munich) and 0.4 part of oleic acid. The further procedure is described as in Example 21. The resulting dry films are brittle in character.

Time to skin formation [min] after a storage of
1 d: 10
30 d: 8

EXAMPLE 25

The procedure described in Example 24 is repeated, except that a mixture of 26 parts of polymer I and 26 parts of polymer II is used instead of 52 parts of polymer II. Data on the mechanical properties on the resulting dry films can be found in Table 8.

Time to skin formation [min] after a storage of
1 d: 10
30 d: 11

TABLE 8

| Example | Tear Strength (N/mm²) | Tear Elongation (%) | Modulus (N/mm²) | Shore-A hardness | Tear propagation strength (N/mm) |
| --- | --- | --- | --- | --- | --- |
| 21a | 1.7 | 320 | 0.7 | 34 | 8.1 |
| 21b | 1.3 | 280 | 0.7 | 31 | 8.1 |
| 22a | 2.9 | 380 | 0.8 | 34 | 8.4 |
| 22b | 2.6 | 330 | 0.8 | 36 | 7.7 |
| 23a | 1.6 | 730 | 0.3 | 13 | 5.9 |
| 23b | 1.5 | 700 | 0.3 | 14 | 6.0 |
| 25a | 0.9 | 310 | 0.4 | 20 | 3.6 |
| 25b | 1.0 | 300 | 0.4 | 19 | 3.5 | a: Film from a composition stored for 1 d
b: Film from a composition stored for 30 d

EXAMPLE 26 a) Component A 58.9 g of an α,ω-divinyldimethylpolysiloxane having a chain length of about 900 siloxane units and a viscosity of 20,000 mPa·s, 33 g of ground quartz (which can be purchased under the name SIlbond 600TST from Quarzwerke GmbH, D-5020 Frechen), 0.0005 g of $H_2PtCl_6·6H_2O$ are thoroughly mixed in a mixture with 0.2 g of isopropanol and 0.25 g of 1,3-divinyltetramethylsiloxane.

b) Component B 50.9 g of an α,ω-divinyldimethylpolysiloxane having a chain length of about 900 siloxane units and a viscosity of 20,000 mPa·s, 19.3 g of silylated silica (which can be purchased under the name T30 from Wacker-Chemie GmbH, D-8000 Munich), 19.3 g of ground quartz (which can be purchased under the name Silbond 600TST from Quarzwerke GmbH, D-5020 Frechen), 7 g of a mixed polymer consisting of trimethylsiloxane, dimethylsiloxane and methylhydrogensiloxane units and having a molar ratio of dimethylsiloxane units to methylhydrogensiloxane units of 1:1 and a viscosity of 60 mPa·s and 0.175 g of 1-ethynylcyclohexanol are thoroughly mixed.

c) Preparation of an
α,ω-bis(diethoxyhydrogen)dimethylpolysiloxane
(siloxane C)

51.8 g of α,ω-dihydroxydimethylpolysiloxane having on average 60 dimethylsiloxy units, 6.60 g of triethoxysilane and 0.58 g of pentanedione are thoroughly mixed with the exclusion of moisture, the mixture is heated to 100° C., stirred at 100° C. for one hour, and the volatile components are removed by evacuation for a short period (15 minutes/1 mbar). The mixture is then filtered through cellulose, giving 52 g of a clear, colourless oil having a viscosity of 70 mPa·s, which by $^{29}$Si NMR spectroscopy has 100% of H-Si-(OEt)$_2$ terminal groups.

The amount listed in Table 1 of the siloxane C described above under c) is added to a mixture comprising 5 g of the component A described above and 5 g of the component B described above, and the mixture is heated in a closed mould comprising four Teflon walls and two opposite aluminium walls under the conditions listed in Table 9 with temperature control.

TABLE 9

| Example | Siloxane C [g] | Temperature [°C.] | Time [h] | Adhesion[12] |
| --- | --- | --- | --- | --- |
| 26.1 | 0.8 | 80 | 1 | + |
| 26.2 | 0.8 | 40 | 1 | + |
| 26.3 | 0.4 | 80 | 1 | + |
| 26.4 | 0.4 | 40 | 1 | — |
|  | then | 23 | 72 | + |

[12].
+ = good adhesion on the aluminium wall = cohesion failure = failure in the elastomer
— = poor adhesion = adhesion failure = release from the aluminium wall

COMPARATIVE EXAMPLE 2

A mixture comprising 5 g of the component A described in Example 26 and 5 g of the component B described in Example 26 is in each case applied in a layer thickness of 0.1 to 0.5 mm to glass, aluminium, copper, silicon (high-purity products), silicone rubber (Shore-A hardness according to DIN 53 505-87 : 45) and iron and cured at 80° C. for one hour while open. Adhesion was achieved on none of the substrates. The resulting elastomer can in each case be peeled off as a film.

EXAMPLE 27

The procedure described in Comparative Example 2 is repeated, except that 0.8 g of the siloxane C described in Example 26 under c) is added to the mixture comprising components A and B. Improved adhesion is observed on all substrates, but the elastomer formed can in all cases be peeled off as a film.

EXAMPLE 28

The procedure described in Comparative Example 2 is repeated, except that a mixture comprising 0.8 g of the siloxane C described in Example 26 under c) and 0.2 g of alginic acid (which can be obtained from Janssen-Chimica, D-4054 Nettetal) which is loaded with 20% of water, relative to the weight of alginic acid, is added to the mixture comprising components A and B.

The elastomer formed has very good adhesion on all substrates nd can only be removed from the particular substrate with mechanical destruction.

EXAMPLE 29

The procedure described in Example 28 is repeated, except that 0.4 g of siloxane C is used instead of 0.8 g of the siloxane C described in Example 26 under c).

The elastomer formed only has very good adhesion on glass and can only be removed from the glass with mechanical destruction. Only after storage at 23° C. for 48 hours is cohesion failure also observed on aluminium.

EXAMPLE 30

The procedure described in Example 28 is repeated, except that the curing takes place at 40° C. instead of at 80° C.

The adhesion of the elastomer formed is good on glass and aluminium. On both substrates, cohesion failure is observed.

EXAMPLE 31

The procedure described in Example 28 is repeated, except that the temperature-controlled heat treatment is carried out at 23° C. for 72 hours instead of at 80° C. for one hour and only glass and aluminium are used as substrates.

The adhesion of the elastomers formed is good on glass and aluminium. On both substrates, cohesion failure is observed.

We claim:

1. An organo(poly)siloxane which contains organyloxy groups and hydrogen atoms in the terminal siloxane units having the general formula

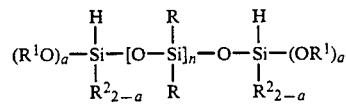

in which R, $R^1$ and $R^2$, each represent a monovalent unsubstituted hydrocarbon radical, or a monovalent substituted hydrocarbon radical, n is an integer of at least 2 and a is 1 or 2.

2. The organo(poly)siloxane of claim 1, wherein n is an integer between 10 and 2500.

3. A process for preparing an organo(poly)siloxane which contains organyloxy groups and hydrogen atoms in the terminal siloxane units having the general formula

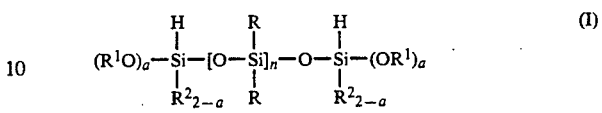

which comprises reacting an α,ω-dihydroxyorgano(poly)siloxane of the formula

with a silane of the formula

in which R, $R^1$ and $R^2$ each represent a monovalent unsubstituted hydrocarbon radical or a monovalent substituted hydrocarbon radical, X is selected from the group consisting of $OR^1$,

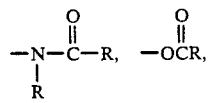

—$NR^1R^2$ and a chlorine atom, where R, $R^1$ and $R^2$ are the same as above, n is an integer of at least 2 and a is 1 or 2.

4. The process of claim 3, wherein the reaction of the α,ω-dihydroxyorgano(poly)siloxane of formula (II) with the silane of formula (III) is carried out in the presence of a catalyst selected from the group consisting of $C_2$ to $C_{16}$-carboxylic acids, $C_2$ to $C_{16}$-dicarboxylic acids, bases, compounds having enolisable groups, phenols, 1,3-dicarbonyl compounds, carboxylic acid esters and carboxylic acid salts.

5. A process for crosslinking the organo(poly)siloxane of claim 1, which comprises exposing the organo(poly)siloxane of formula (I) to moisture.

6. The process of claim 5, wherein the crosslinking is carried out in the presence of a condensation catalyst.

7. An organo(poly)siloxane composition which can be crosslinked with the elimination of an alcohol to form an elastomer containing (A) at least one organo(poly)siloxane of the formula

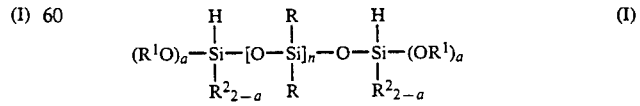

in which R, $R^1$ and $R^2$ each represent a monovalent unsubstituted hydrocarbon radical or a monovalent substituted hydrocarbon radical, a is 1 or 2 and n is an integer of at least 2 and optionally (B) a hydrido-functional organyloxysilane, (C) a condensation catalyst, (D) a filler, (E) a plasticizer, (F) an adhesion promoter, (G) a scavenger for water, alcohol or silanol, (H) dyes, fungicides or thixotropic agents.

8. The composition of claim 7, which also contains a hydridofunctional organyloxysiloxane of the formula

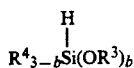  (IV)

in which $R^3$ and $R^4$ each represent a monovalent unsubstituted hydrocarbon radical, or a monovalent substituted hydrocarbon radical, and b is 2 or 3.

9. The composition of claim 7, which contains,
(A) 20 to 80 percent by weight of an organo(poly)-siloxane of the formula

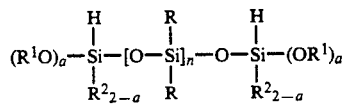  (I)

in which R, $R^1$ and $R^2$, each represent a monovalent unsubstituted hydrocarbon radical, or a monovalent unsubstituted hydrocarbon radical, n is an integer of at least 2 and a is 1 or 2,
(B) 0 to 30 percent by weight of a hydrido-functional organyloxysilane,
(C) 0 to 5 percent by weight of a condensation catalyst,
(D) 0 to 70 percent by weight of filler,
(E) 0 to 60 percent by weight of plasticiser,
(F) 0 to 20 percent by weight of adhesion promoter,
(G) 0 to 20 percent by weight of a scavenger for water, alcohol or silanol and
(H) optionally, substances selected from the group consisting of dyes, fungicides and thixotropic agents in which the percent by weight is based on the weight of the composition.

10. A process for preparing a composition which can be crosslinked with the elimination of an alcohol to form an elastomer, which comprises mixing (A) an organo(poly)siloxane of the general formula

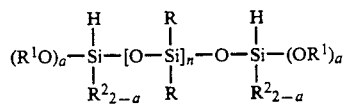  (I)

in which R, $R^1$ and $R^2$ each represent a monovalent unsubstituted hydrocarbon radical or a monovalent substituted hydrocarbon radical, n is an integer of at least 2 and and a is 1 or 2, with other constituents optionally selected from (B) a hydrido-functional organyloxysilane, (C) a condensation catalyst, (D) a filler, (E) a plasticizer, (F) an adhesion promoter, (G) a scavenger for water, alcohol or silanol, (H) dyes, fungicides or thixotropic agents, in any desired order and stirring the mixture in a first step at a temperature of from 15° to 80° C. and a pressure of from 900 to 1100 hPa for a period of from 20 to 90 minutes and then in a second step stirring at a pressure of from 0.01 to 100 hPa for a period of from 3 to 60 minutes, at such a rate that the temperature of the composition increases during stirring without any further addition of heat to a value within the temperature range of from 15° C. to 80° C.

11. The process of claim 10, wherein the composition contains
(A) 20 to 80 percent by weight of the organo(poly)-siloxane of formula (I),
(B) 0 to 30 percent by weight of a hydrido-functional organyloxysilane,
(C) 0 to 5 percent by weight of a condensation catalyst,
(D) 0 to 70 percent by weight of filler,
(E) 0 to 60 percent by weight of plasticiser,
(F) 0 to 20 percent by weight of adhesion promoter,
(G) 0 to 20 percent by weight of a scavenger for water, alcohol or silanol and
(H) optionally, substances selected from the group consisting of dyes, fungicides and thixotropic agents in which the percent of weight is based on the weight of the composition.

12. A crosslinkable composition containing (a) an organo(poly)siloxane having the general formula

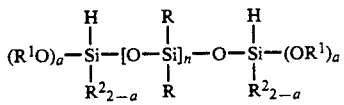  (I)

in which R, $R^1$ and $R^2$ each represent a monovalent unsubstituted hydrocarbon radical, or a monovalent substituted hydrocarbon radical, n is an integer of at least 2 and a is 1 or 2, (b) an organo(poly)siloxane having SiC-bonded organic radicals having an aliphatic carbon-carbon multiple bond, (c) a compound having Si-bonded hydrogen, and (d) a catalyst which promotes the addition of Si-bonded hydrogen to SiC-bonded organic radicals having an aliphatic carbon-carbon multiple bond.

13. The composition of claim 12, wherein the crosslinkable composition contains the organo(poly)siloxane (a) in an amount of from 1 to 20 percent by weight based on the total weight of constituents (b) and (c).

14. The composition of claim 12, wherein the crosslinkable composition also contains, compound (e) which releases physically or chemically bound water at a temperature above about 23° C.

15. An organo(poly)siloxane elastomer which is obtained by crosslinking an organo(poly)siloxane having the general formula

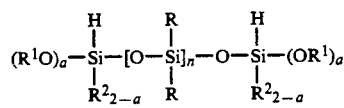  (I)

in which R, $R^1$ and $R^2$, each represent a monovalent unsubstituted hydrocarbon radical, or a monovalent substituted radical, n is an integer of at least 2 and a is 1 or 2 in the presence of moisture and with the elimination of an alcohol.

* * * * *